(12) United States Patent
Masuda et al.

(10) Patent No.: US 8,333,920 B2
(45) Date of Patent: Dec. 18, 2012

(54) MELT SUPPLY PIPE FOR ALUMINUM DIE CASTING

(75) Inventors: Jun Masuda, Mishima (JP); Ryosuke Fujimoto, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 191 days.

(21) Appl. No.: 11/565,771

(22) Filed: Dec. 1, 2006

(65) Prior Publication Data

US 2007/0144627 A1    Jun. 28, 2007

(30) Foreign Application Priority Data

Dec. 2, 2005    (JP) .................................. 2005-348830

(51) Int. Cl.
*C21D 8/10*    (2006.01)
(52) U.S. Cl. .......................................... 266/236; 266/285
(58) Field of Classification Search .................... None
See application file for complete search history.

(56) References Cited

U.S. PATENT DOCUMENTS

| | | | |
|---|---|---|---|
| 3,495,630 A * | 2/1970 | Hansen et al. | 138/149 |
| 4,197,902 A | 4/1980 | Von Jan et al. | |
| 4,733,715 A | 3/1988 | Matsuzaki | |
| 4,868,069 A | 9/1989 | Darrow | |
| 4,951,888 A | 8/1990 | Sharpe et al. | |
| 4,995,427 A * | 2/1991 | Berchem | 138/155 |
| 4,996,114 A | 2/1991 | Darrow | |
| 2005/0116192 A1 * | 6/2005 | Vincent | 251/318 |
| 2007/0144627 A1 | 6/2007 | Masuda et al. | |
| 2007/0196684 A1 | 8/2007 | Masuda et al. | |

FOREIGN PATENT DOCUMENTS

| | | |
|---|---|---|
| EP | 0695598 A1 | 2/1996 |
| JP | 51-20303 | 2/1976 |
| JP | 03-126681 | 5/1991 |
| JP | 07-001077 | 1/1995 |
| JP | 08-025063 | 1/1996 |
| JP | 08-132215 | 5/1996 |
| JP | 08-229657 | 9/1996 |
| JP | 2000-351054 | 12/2000 |
| JP | 2001-287004 | 10/2001 |
| JP | 2001-300711 | 10/2001 |
| JP | 2001-342530 | 12/2001 |
| JP | 2002-066708 | 3/2002 |
| JP | 2003-170262 | 6/2003 |
| JP | 2005-264306 | 9/2005 |

(Continued)

OTHER PUBLICATIONS

Office Action issued in related U.S. Appl. No. 10/599,118 on Jul. 22, 2009.

(Continued)

*Primary Examiner* — Scott Kastler
(74) *Attorney, Agent, or Firm* — DLA Piper LLP (US)

(57) ABSTRACT

There is provided a melt supply pipe for aluminum die casting which is strong to mechanical impact and is excellent in the melting loss resistance to a molten aluminum alloy and which has a significantly extended life. The melt supply pipe for connecting a melting furnace and a plunger sleeve of a die casting machine, includes an inner ceramic pipe and an outer steel pipe fitted to the inner pipe, wherein a Ni alloy layer is formed over the inner circumferential surface of the outer steel pipe, and TiC particles are bonded to the surface of the Ni alloy layer.

24 Claims, 3 Drawing Sheets

FOREIGN PATENT DOCUMENTS

| | | | |
|---|---|---|---|
| JP | 2005264306 A | * | 9/2005 |
| KR | 10-1987-11269 | | 12/1987 |

OTHER PUBLICATIONS

Office Action issued in U.S. Appl. No. 10/599,118 on Feb. 18, 2010.
File History of U.S. Appl. No. 10/599,118 from Jun. 28, 2010 to Sep. 28, 2010.
Japanese Office Action issued in Application No. 2004-82990, mailed Apr. 7, 2009.
English Translation of Japanese Office Action issued in Application No. 2004-82990, mailed Apr. 7, 2009.
Machine English language translation of JP 07-001077, published Jan. 6, 1995.
English Abstract of JP 07-001077.
Machine English language translation of JP 2003-170262, published Jun. 17, 2003.
English Abstract of JP 2003-170262.
Machine English language translation of JP 08-132215, published May 28, 1996.
English Abstract of JP 08-132215.
Notice of Allowance issued in Korean Patent Application No. 2006-0118288 mailed Apr. 4, 2008.
English Abstract of JP03-126681.
English Abstract of JP08-025063.
English Abstract of JP08-229657.
English Abstract of JP 2001-287004.
English Abstract of JP 2001-342530.
English Abstract of KR 10-1987-0011269.
Machine translation in English for JP 08-229657.
Machine translation in English for JP 2001-287004.
Machine translation in English for JP 2001-342530.
File History of U.S. Appl. No. 12/293,556.
File History of U.S. Appl. No. 12/891,477.
Office Action issued in U.S. Appl. 10/599,118 on Jun. 27, 2008.
JP 2001-300711 English Machine Translation, Negishi, Oct. 2001.
JP 76020303, Nippon Tungsten KK, Jun. 1976, Titanium Carbide Cement Scraping Tool Formed as a Nitrided Layer on Steel Substrate, English Abstract from DWPI Database.
English International Preliminary Examination Report for PCT/JP05/000510, Jan. 2007.
Notice of Allowance issued in related Korean Parent Application No. 2006-018288, mailed Apr. 4, 2008.
English Abstract of JP 08-025063.
Machine English language translation of JP 08-025063, published Jan. 30, 1996.
International Search Report of PCT/JP2007/056048.
English Language Abstract for JP 2005 264306.
English Language translation of JP-2005-264306.
English Language Abstract for JP 2000 351054.
English Language translation of JP-2000-351054.
English Language Abstract for JP 2002 066708.
English Language translation of JP-2002-066708.
English Language Abstract for JP 2001-300711.
English language translation of International Preliminary Report on Patentability issued in Application No. PCT/JP07/056048 mailed Nov. 13, 2008.
Final Office Action issued in U.S. Appl. No. 10/599,118 mailed Feb. 3, 2009.
International Search Report issued in PCT/JP05/05100 on Jul. 5, 2005.

\* cited by examiner

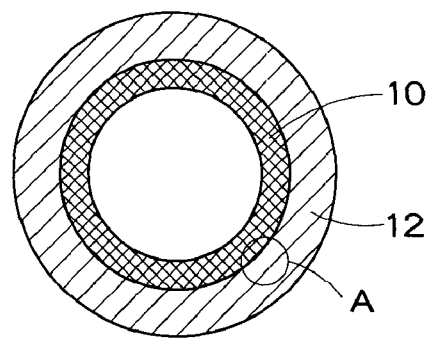
F I G. 1
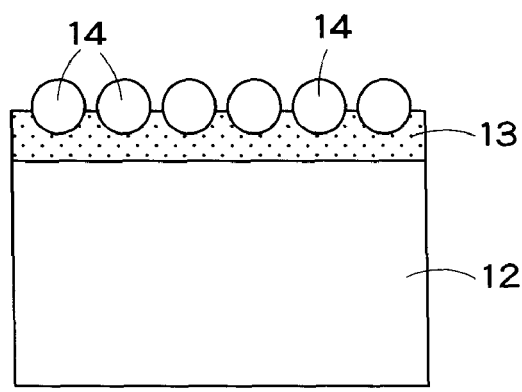
F I G. 2
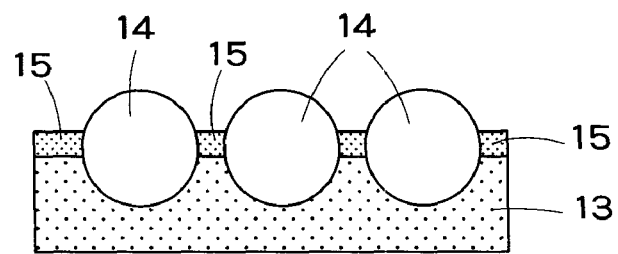
F I G. 3

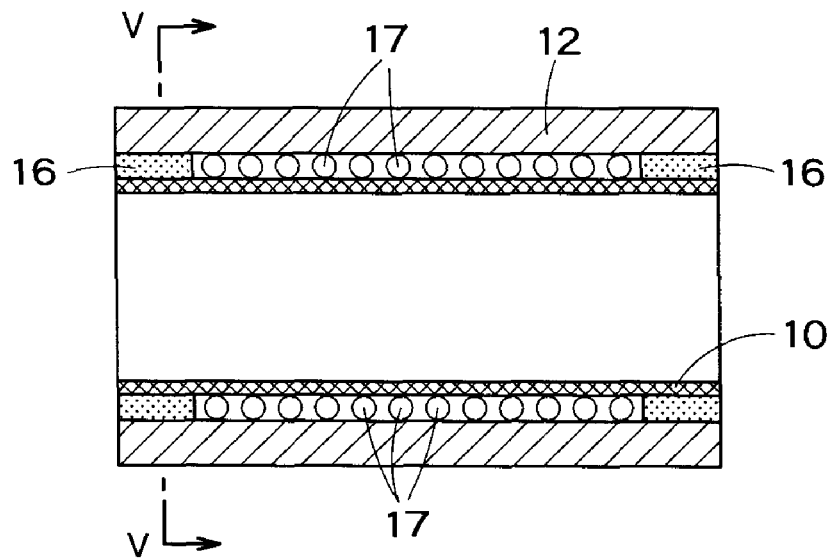
F I G. 4
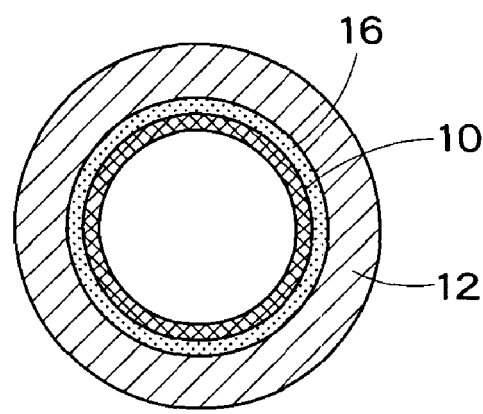
F I G. 5

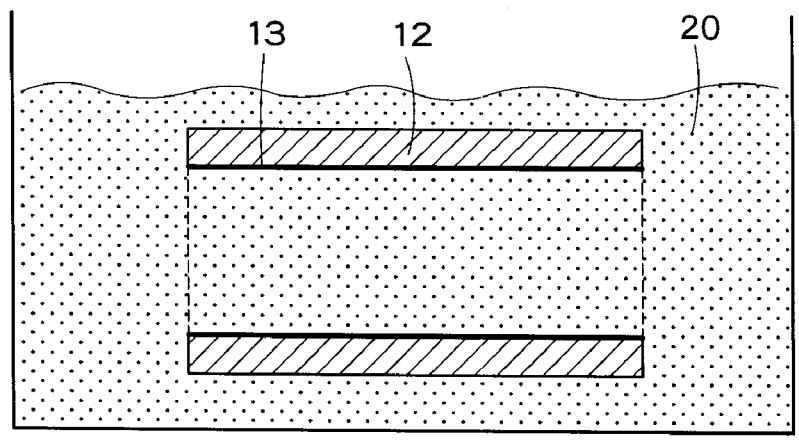
F I G. 6
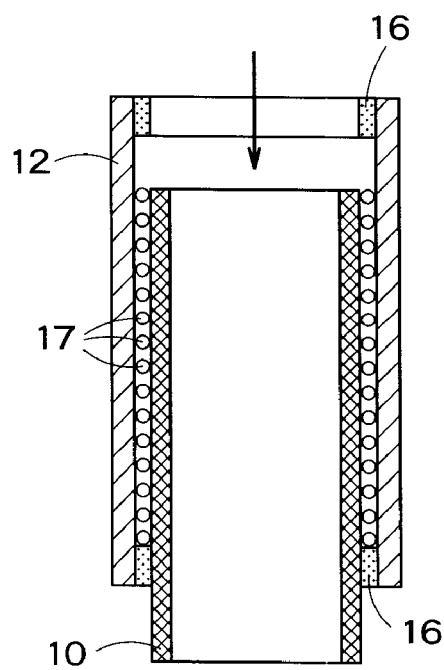
F I G. 7

MELT SUPPLY PIPE FOR ALUMINUM DIE CASTING

BACKGROUND OF THE INVENTION

1. Field of the Invention

The present invention relates to a melt supply pipe for supplying a molten aluminum alloy from a melting furnace to a plunger sleeve of a die casting machine in aluminum die casting.

2. Background Art

In conventional die casting machines, a ladle method has been commonly employed for supplying a molten aluminum alloy to a plunger sleeve. According to the ladle method, a molten aluminum alloy is drawn from a melting furnace by means of a ladle and supplied to a plunger sleeve.

As a technique to take the place of the ladle method, a melt supply pipe method has recently been attracting attention which involves directly connecting a melting furnace and a plunger sleeve with a melt supply pipe, and supplying a molten aluminum alloy through the melt supply pipe to the plunger sleeve. Mixing of an Al oxide film or solid broken pieces into a molten aluminum alloy can be significantly reduced with the melt supply pipe method as compared to the conventional ladle method. The melt supply pipe method thus has the advantage that it can provide a higher-quality die-cast product.

A conventional melt supply pipe, which has so far been used to connect a melting furnace and a plunger sleeve, has such a structure that a heater is wrapped around a ceramic pipe. A ceramic material is used for a melt supply pipe because the material has high melting loss resistance to a molten aluminum alloy.

While a ceramic pipe is thus strong to a molten aluminum alloy, it is weak to impact and can be broken by its vibration during operation or by erroneous handling upon its maintenance. Further, only an insufficient load can be applied on the connecting portions of such a breakable ceramic pipe, which could cause leakage of a molten aluminum alloy from the connecting portions.

The applicant has proposed a molten aluminum alloy-contact member having enhanced melting loss resistance to a molten aluminum alloy, comprising a steel base, a Ni alloy layer formed on the steel base, and TiC bonded in a particulate state to the surface of the Ni alloy layer (Japanese Patent Laid-Open Publication No. 2005-264306).

Further, a melt supply pipe is known which has such a structure that a ceramic or graphitic pipe is encased in a steel pipe for the purpose of covering the breakableness of the inner pipe. However, because of a large difference in thermal expansion coefficient between the steel pipe and the ceramic or graphitic pipe, a large gap can be formed between the inner and outer pipes due to their different thermal expansions. A molten aluminum alloy will easily intrude into the gap, which may result in melting loss of the steel pipe and formation of holes therein in a short period of time.

SUMMARY OF THE INVENTION

It is therefore an object of the present invention to solve the above problems in the prior art and provide a melt supply pipe for aluminum die casting which is strong to mechanical impact and is excellent in the melting loss resistance to a molten aluminum alloy and which has a significantly extended life, and a method for producing the melt supply pipe.

In order to achieve the object, the present invention provides a melt supply pipe for connecting a melting furnace and a plunger sleeve of a die casting machine, comprising an inner ceramic pipe and an outer steel pipe fitted to the inner pipe, wherein a Ni alloy layer is formed over the inner circumferential surface of the outer steel pipe, and TiC particles are bonded to the surface of the Ni alloy layer.

In a preferred embodiment of the present invention, the TiC particles have an average particle diameter of 10 to 500 μm, and are bonded to the Ni alloy layer in such a state that the particles are not fully covered with the Ni alloy layer but partly protrude from the surface of the Ni alloy layer.

The Ni alloy preferably has the composition of 2.6 to 3.2% of B, 18 to 28% of Mo, 3.6 to 5.2% of Si and 0.05 to 0.22% of C, with the remainder being Ni and unavoidable impurities.

In a preferred embodiment of the present invention, gaps in the TiC particles are filled in with powder comprising at least one of boron nitride (BN), alumina ($Al_2O_3$), zirconia ($ZrO_2$) and silicon nitride ($Si_3N_4$).

In a preferred embodiment of the present invention, a pair of fibrous sheet members, composed of an inorganic material having the property of expanding by heating, is sandwiched between the inner ceramic pipe and the outer steel pipe at both ends of the pipes. Preferably, the gap formed between the inner ceramic pipe and the outer steel pipe and defined by the sheet members, is filled with a spherical or particulate ceramic filler.

The present invention also provides a method for producing a melt supply pipe, composed of an inner ceramic pipe and an outer steel pipe fitted to the inner pipe, for connecting a melting furnace and a plunger sleeve of a die casting machine, comprising the steps of: forming a Ni alloy layer over the inner circumferential surface of the outer steel pipe; burying the outer pipe with the Ni alloy layer in TiC powder, and heating the pipe and the powder under vacuum in a vacuum heating oven to a temperature at which a liquid phase is generated from the Ni alloy, thereby bonding the TiC particles to the surface of the Ni alloy layer; and fitting the inner ceramic pipe into the outer pipe with the TiC particles bonded to the inner circumferential surface, thereby assembling the melt supply pipe.

According to the present invention, the outer steel pipe can protect the inner ceramic pipe from mechanical impact and, in addition, enables application of a sufficient clamp load on the terminal connecting portions of the melt supply pipe, thereby preventing leakage of a molten aluminum alloy. Furthermore, owing to TiC particles densely scattered over the inner circumferential surface of the outer pipe, the present melt supply pipe has significantly enhanced melting loss resistance to a molten aluminum alloy. Thus, the melting supply pipe of the present invention, having both high impact resistance and high meting loss resistance, can enjoy a significantly extended life.

BRIEF DESCRIPTION OF THE DRAWINGS

FIG. 1 is a cross-sectional diagram showing a melt supply pipe for aluminum die casting according to a first embodiment of the present invention;

FIG. 2 is an enlarged illustration of the portion A of FIG. 1;

FIG. 3 is a diagram corresponding to FIG. 2, illustrating the case of filling in the gaps in TiC particles with fine ceramic particles;

FIG. 4 is a vertical sectional diagram showing a melt supply pipe for aluminum die casing according to a second embodiment of the present invention;

FIG. 5 is a cross-sectional diagram taken along the line V-V of FIG. 4;

FIG. 6 is a diagram illustrating a method for producing a melt supply pipe for aluminum die casting according to the present invention; and FIG. 7 is a diagram illustrating the step of fitting an inner pipe into an outer pipe in the method for producing a melt supply pipe for aluminum die casting according to the present invention.

DETAILED DESCRIPTION OF THE PREFERRED EMBODIMENTS

Preferred embodiments of the present invention will now be described in detail with reference to the drawings.

FIG. 1 is a cross-sectional diagram showing the structure of a melt supply pipe according to a first embodiment of the present invention. In FIG. 1, reference numeral 10 denotes an inner ceramic pipe and reference numeral 12 denotes an outer steel pipe. The inner pipe 10/outer pipe 12 integral structure of the melt supply pipe is obtained by fitting the outer pipe 12 to the inner pipe 10.

As shown in FIG. 2 which is an enlarged view of the portion A of FIG. 1, the entire inner circumferential surface of the outer steel pipe 12 is coated with a Ni alloy layer 13, and the surface of the Ni alloy layer 13 is covered with a myriad of titanium carbide (TiC) particles. The TiC particles 14 are bonded in a particulate state to the Ni alloy layer 13 such that they partly protrude from the surface of the Ni alloy layer 13. Preferably, the gaps in the TiC particles are filled in with fine ceramic particles 15 comprising at least one of boron nitride (BN), alumina ($Al_2O_3$), zirconia ($ZrO_2$) and silicon nitride ($Si_3N_4$), as shown in FIG. 3. The fine ceramic particles 15 can improve the melting loss resistance of the base Ni alloy layer 13 to which the TiC particles 14 are bonded.

According to the melt supply pipe of this embodiment, which employs the combination of the inner ceramic pipe 10 and the outer steel pipe 12, the outer steel pipe 12 can protect the inner ceramic pipe 10 from external mechanical impact and, in addition, enables application of a sufficient clamp load on the terminal connecting portions of the melt supply pipe, thereby preventing leakage of a molten aluminum alloy.

Furthermore, the TiC particles 14 are bonded to the Ni alloy layer 13 formed over the inner circumferential surface of the outer steel pipe 12. The TiC particles 14 have the property of repelling a molten aluminum alloy. By utilizing this property, direct contact of a molten aluminum alloy with the steel material, constituting the main body of the outer pipe 12, can be prevented and the melting loss resistance of the outer pipe can thus be enhanced. Further, the TiC particles 14 are made to partly extrude from the surface of the Ni alloy layer 13. This can increase the contact angle with a molten aluminum alloy, thereby enhancing the property of repelling the molten aluminum alloy.

In the structure that the TiC is bonded in a particulate state to the Ni alloy layer 13 and densely scattered over the layer, a large thermal stress will not act on the TiC particles 14 even when the outer pipe 12 thermally expands or contracts. Thus, the TiC particles 14 hardly peel off and, therefore, the melting loss resistance can be maintained for a long period of time. Though FIG. 2 schematically shows the TiC particles 14 lining up side by side, there is actually a case in which the TiC particles 14 are piled up in multiple layers.

The base Ni alloy layer 13, to which the TiC particles 14 are bonded, itself has poor melting loss resistance to a molten Al alloy. The melting loss resistance can be improved by attaching the fine ceramic particles 15 to the Ni alloy layer 13, as shown in FIG. 3. Since the attached fine ceramic particles 15 are present such that they fill in the gaps in the TiC particles 14, the fine ceramic particles 15 hardly fall off upon contact with a molten aluminum alloy. It is possible that the fine ceramic particles 15 may adhere also to the surfaces of the protruding portions of the TiC particles 14.

The inner pipe 12, on the other hand, can be made to resist melting loss for a long period of time by selecting a ceramic material having excellent melting loss resistance to a molten aluminum alloy. A preferable ceramic material may comprise at least one of $Al_2O_3$, SiC, $Si_3N_4$, MgO, $Al_2TiO_5$, $ZrO_2$, and sialon.

A melt supply pipe for aluminum die casting according to a second embodiment of the present invention will now be described with reference to FIGS. 4 and 5.

In the melt supply pipe of the second embodiment, a pair of fire-resistant sheets 16 is sandwiched between the inner ceramic pipe 10 and the outer steel pipe 12 at both ends of the pipes, and the gap formed between the inner and outer pipes and defined by the fire-resistant sheets 16 is filled with ceramic balls 17.

The fire-resistant sheet 16 is a sheet member composed of inorganic fibers having the property of expanding by heating. Preferably, each fire-resistant sheet 16 extends over the entire circumference, and the outer end of the sheet is aligned with the end surfaces of the inner pipe 10 and the outer pipe 12. The balls 17 are a spherical filler formed of a ceramic material comprising at least one of $Al_2O_3$, SiC, $Si_3N_4$, MgO, $Al_2TiO_5$, $ZrO_2$, and sialon. It is also possible to use a particulate filler instead of the balls 17.

According to the second embodiment, there is no gap between the inner ceramic pipe 10 and the outer steel pipe 12 at both ends of the pipes because of the presence of the fire-resistant sheets 16. Even when a gap is formed between the inner pipe 10 and the outer pipe 12 upon heating by a molten aluminum alloy, due to a difference in thermal expansion coefficient between the pipes, the fire-resistant sheets 16 can prevent the molten aluminum alloy from intruding into the gap.

Since the internal gap defined by the fire-resistant sheets 16 and the inner and outer pipes 10, 12 is filled with the balls 17, the weight of a molten aluminum alloy flowing in the inner ceramic pipe is supported by the balls 17, so that application of the weight of the molten aluminum alloy on the inner pipe 10 can be prevented.

A description will now be made of a method for producing the melt supply pipe for aluminum die casting, according to the present invention.

The inner ceramic pipe 10 and the outer steel pipe 12 are prepared in advance, and the melt supply pipe is produced by the following procedure:

First, the Ni alloy layer 13 is formed by thermal spraying on the inner circumferential surface of the outer pipe 12. Thereafter, a vessel containing TiC powder 20 is prepared, and the outer pipe 12 is entirely buried in the TiC powder 20, as shown in FIG. 6.

The vessel, containing the TiC powder 20 and the outer pipe 12 buried in it, is placed in a vacuum heating oven, and heated under vacuum to a temperature at which a liquid phase is generated from the Ni alloy, thereby bonding TiC particles 14 to the surface of the Ni alloy layer 13.

By the heating in this step, the TiC particles 14 are bonded to the Ni alloy layer in such a state that they protrude from the surface of the Ni alloy layer 13, as shown in FIG. 2. In this connection, it is undesirable if the TiC particles 14 become entirely covered with the melting Ni alloy in the heating process. In order not to entirely cover the TiC particles 14 with the Ni alloy but to strongly bond the TiC particles 14 to the Ni alloy layer 13 with the particles partly exposed on the surface of the Ni alloy layer 13, the average particle diameter of the TiC particles 14 is preferably made within the range of 10 to 500 μm.

When the average particle diameter of the TiC particles 14 is smaller than 10 μm, it is difficult to control the temperature during the vacuum heating so that the TiC particles 14 may not be entirely covered with the liquid phase of the Ni alloy. The intended melting loss resistance will not be obtained if the TiC particles 14 are entirely covered with the liquid phase of the Ni alloy.

When the average particle diameter of the TiC particles 14 is larger than 500 μm, on the other hand, the liquid phase of the Ni alloy will cover only lower portions of the particles with small contact area, resulting in weak bonding strength between the Ni alloy layer 13 and the TiC particles 14. Accordingly, the TiC particles 14 will easily fall off.

After the bonding of TiC particles 14 to the Ni alloy layer 13, the outer pipe 12 is subjected to a process comprising applying a slurry of a mixture of a binder and a fine ceramic powder comprising at least one of boron nitride (BN), alumina ($Al_2O_3$), zirconia ($ZrO_2$) and silicon nitride ($Si_3N_4$) to the inner circumferential surface of the outer pipe 12, and burning the ceramic powder into the inner circumferential surface.

As shown in FIG. 3, the TiC particles 14 can be bonded to the Ni alloy layer 13 with high strength through generation of the liquid phase from the Ni alloy. Further, because of good wetting between the liquid phase and the TiC particles 14, a large number of TiC particles 14 can be densely bonded to the Ni alloy layer 13.

Next, as shown in FIG. 7, the inner pipe 10 is inserted into the outer pipe 12. Prior to the insertion, the fire-resistant sheets 16 are placed on the inner circumference surface of the outer pipe 12 at its both ends such that each sheet 16 extends over the entire circumference. After inserting one end of the inner pipe 10 and before inserting the other end into the outer pipe 12, the ceramic balls 17 are filled into the gap between the inner pipe 10 and the outer pipe 12. Thereafter, the inner pipe 10 is completely inserted into the outer pipe 12 till the other end of the inner pipe 10 reaches the fire-resistant sheet 16.

The thus-produced melt supply pipe was fixed in an actual die casting machine to carry out a durability test by repeating a casting cycle of supplying a molten aluminum alloy from a melting furnace through the melt supply pipe to a plunger sleeve of the die casting machine. The test conditions were as follows: the type of molten aluminum alloy, JIS AC4CH; the melt temperature, 72° C.; and the temperature of a melt supply pipe heater, 720° C. Comparative durability tests were also carried out under the same conditions but using, instead of the present melt supply pipe, a comparative ceramic melt supply pipe 1 (composition: 70% SiC/30% $Si_3N_4$) (comp. test 1) or a comparative melt supply pipe 2 composed of an outer steel (JIS S45C) pipe and an inner graphitic pipe thermally inserted into the outer pipe (comp. test 2).

As a result, a connecting portion of the comparative melt supply pipe 1 broke and the melt began to leak out after about 40,000 shots in comp. test 1. In comp. test 2, a connecting portion of the comparative melt supply pipe 2 broke by melting loss and the melt began to leak out after about 8000 shots. The early melting loss in comp. test 2 is considered to be caused by early formation of a gap between the graphitic pipe and the steel pipe due to a large difference in thermal expansion coefficient therebetween. Thus, intrusion of the melt into the gap may have caused melting loss of the steel pipe. In contrast, no defect, such as melting loss, was found in the melt supply pipe of the present invention even after 120,000 shots, and the operation could be continued.

What is claimed is:

1. A melt supply pipe for connecting a melting furnace and a plunger sleeve of a die casting machine, comprising:
   an inner ceramic pipe having terminal connecting portions that abut adjacent inner ceramic pipes;
   an outer steel pipe fitted, along its inside, around the inner pipe and configured to provide a clamp load to the terminal connecting portions to thereby reduce leakage of the melt supply through seams between abutting inner ceramic pipes;
   a Ni alloy layer formed over the inside of the outer steel pipe;
   TiC particles bonded to the surface of the Ni alloy layer, wherein the layer is formed over the inside of the outer steel pipe, along an inner circumferential surface that is not in contact with molten material in the inner ceramic pipe; and
   a pair of fibrous sheet members, composed of an inorganic material having the property of expanding by heating, sandwiched between the inner ceramic pipe and the outer steel pipe at both ends of the pipes, wherein the fibrous sheet members expand at a temperature of molten aluminum to prevent molten aluminum from leaking through gaps between the inner ceramic pipes to reach the outer steel pipe;
   wherein the TiC particles are bonded into the Ni alloy layer so that the TiC particles protrude inwardly, out of the Ni alloy layer on the inside surface of the outer steel pipe, toward the inner ceramic pipe, such that, as a function of the protruding TiC particles and positioning of the inner ceramic pipe within the outer steel pipe: (1) the TiC particles yield resistance to thermal stress even when the outer steel pipe expands or contracts, and (2) the TiC particles provide melt loss resistance from melt leaking through gaps between adjacent inner ceramic pipes to provide melting loss resistance of an enhanced nature over melt supply pipes that are absent TiC particulate material between inner and outer pipe elements;
   wherein the melt supply pipe yields improved durability and extended operational life at a temperature of molten aluminum as a function of arrangement of the TiC particles between the inner pipe and the outer pipe, which provides: (1) resistance to thermal stress stemming from expansion or contraction of the outer steel pipe, and (2) enhanced resistance of the outer steel pipe to melting loss caused by heat-related shock/stress given by contact with molten aluminum.

2. The melt supply pipe according to claim 1, wherein the TiC particles have an average particle diameter of 10 to 500 μm, and are bonded to the Ni alloy layer in such a state that the particles are not fully covered with the Ni alloy layer but partly protrude from the surface of the Ni alloy layer.

3. The melt supply pipe according to claim 1, wherein the Ni alloy has the composition of 2.6 to 3.2% of B, 18 to 28% of Mo, 3.6 to 5.2% of Si and 0.05 to 0.22% of C, with the remainder being Ni and unavoidable impurities.

4. The melt supply pipe according to claim 2, wherein gaps in the TiC particles are filled in with powder comprising at least one of boron nitride (BN), alumina ($Al_2O_3$), zirconia ($ZrO_2$) and silicon nitride ($Si_3N_4$).

5. The melt supply pipe according to claim 1, wherein the gap formed between the inner ceramic pipe and the outer steel pipe and defined by the sheet members, is filled with a spherical or particulate ceramic filler.

6. The melt supply pipe according to claim 5, wherein the inner ceramic pipe is composed of a ceramic material comprising at least one of $Al_2O_3$, SiC, $Si_3N_4$, MgO, $Al_2TiO_5$, $ZrO_2$, and sialon.

7. The melt supply pipe according to claim 5, wherein the spherical or particulate ceramic filler is composed of a ceramic material comprising at least one of $Al_2O_3$, SiC, $Si_3N_4$, MgO, $Al_2TiO_5$, $ZrO_2$, and sialon.

8. The melt supply pipe according to claim 1, wherein gaps in the TiC particles are filled in with powder comprising at least one of boron nitride (BN), alumina ($Al_2O_3$), zirconia ($ZrO_2$) and silicon nitride ($Si_3N_4$).

9. The melt supply pipe according to claim 8, wherein the inner ceramic pipe is composed of a ceramic material comprising at least one of $Al_2O_3$, SiC, $Si_3N_4$, MgO, $Al_2TiO_5$, $ZrO_2$, and sialon.

10. The melt supply pipe according to claim 4, wherein the TiC particles are resistant to peeling from one or both of thermal stress or thermal expansion/contraction of the outer steel pipe such that an extended duration of melting loss resistance to the melt supply pipe is provided.

11. The melt supply pipe according to claim 1, wherein the TiC particles are resistant to peeling from one or both of thermal stress or thermal expansion/contraction of the outer steel pipe such that an extended duration of melting loss resistance to the melt supply pipe is provided.

12. The melt supply pipe according to claim 2, wherein the TiC particles are resistant to peeling from one or both of thermal stress or thermal expansion/contraction of the outer steel pipe such that an extended duration of melting loss resistance to the melt supply pipe is provided.

13. The melt supply pipe according to claim 1, wherein the inner ceramic pipe is composed of a ceramic material comprising at least one of $Al_2O_3$, SiC, $Si_3N_4$, MgO, $Al_2TiO_5$, $ZrO_2$, and sialon.

14. The melt supply pipe according to claim 8, wherein the gap formed between the inner ceramic pipe and the outer steel pipe and defined by the sheet members, is filled with a spherical or particulate ceramic filler.

15. The melt supply pipe according to claim 14, wherein the spherical or particulate ceramic filler is composed of a ceramic material comprising at least one of $Al_2O_3$, SiC, $Si_3N_4$, MgO, $Al_2TiO_5$, $ZrO_2$, and sialon.

16. A melt supply pipe for connecting a melting furnace and a plunger sleeve of a die casting machine, comprising:
an inner ceramic pipe having terminal connecting portions that abut adjacent inner ceramic pipes;
an outer steel pipe fitted, along its inside, around the inner pipe and configured to provide a clamp load to the terminal connecting portions to thereby reduce leakage of the melt supply through seams between abutting inner ceramic pipes;
a Ni alloy layer formed over the inside of the outer steel pipe, wherein the layer is formed over the inside surface of the outer steel pipe;
TiC particles bonded to the surface of the Ni alloy layer, wherein the TiC particles have an average diameter between about 10 μm to about 500 μm and are partially embedded within, but not entirely covered by, the Ni alloy layer; and
a pair of fibrous sheet members, composed of an inorganic material having the property of expanding by heating, sandwiched between the inner ceramic pipe and the outer steel pipe at both ends of the pipes, wherein the fibrous sheet members expand at a temperature of molten aluminum to prevent molten aluminum from leaking through gaps between the inner ceramic pipes to reach the outer steel pipe;
wherein the TiC particles are bonded into the Ni alloy layer so that the TiC particles protrude inwardly, out of the Ni alloy layer on the inside surface of the outer steel pipe, toward the inner ceramic pipe, such that, as a function of the protruding TiC particles and positioning of the inner ceramic pipe within the outer steel pipe: (1) the TiC particles yield resistance to thermal stress even when the outer steel pipe expands or contracts, and (2) the TiC particles provide melt loss resistance from melt leaking through gaps between adjacent inner ceramic pipes to provide melting loss resistance of an enhanced nature over melt supply pipes that are absent TiC particulate material between inner and outer pipe elements; and
wherein the melt supply pipe yields improved durability and extended operational life at a temperature of molten aluminum as a function of arrangement of the TiC particles and the fibrous sheets between the inner pipe and the outer pipe, which: (1) via fibrous sheets that expand at the temperature of molten aluminum, prevents molten aluminum from intrusion to the outer steel pipe between gaps in the inner ceramic pipes, (2) provides resistance to thermal stress stemming from expansion or contraction of the outer steel pipe, and (3) provides enhanced resistance of the outer steel pipe to melting loss caused by heat-related shock/stress given by contact with molten aluminum.

17. The melt supply pipe according to claim 13, wherein gaps in the TiC particles are filled in with powder comprising at least one of boron nitride (BN), alumina ($Al_2O_3$), zirconia ($ZrO_2$) and silicon nitride ($Si_3N_4$).

18. The melt supply pipe according to claim 8, wherein the TiC particles are resistant to peeling from one or both of thermal stress or thermal expansion/contraction of the outer steel pipe such that an extended duration of melting loss resistance to the melt supply pipe is provided.

19. The melt supply pipe according to claim 1, wherein the Ni alloy layer and the TiC particles provide resistance to thermal stress operating between the inner ceramic pipe and the outer steel pipe and associated with the seams, to thereby improve durability and extend operational life of the melt supply pipe.

20. The melt supply pipe according to claim 16, wherein gaps in the TiC particles are filled in with powder comprising at least one of boron nitride (BN), alumina ($Al_2O_3$), zirconia ($ZrO_2$) and silicon nitride ($Si_3N_4$).

21. The melt supply pipe according to claim 16 further comprising fine ceramic particles attached to the Ni alloy layer, filling gaps between the TiC particles.

22. A system comprising:
a melting furnace;
a die casting machine with a plunger sleeve connected to the melting furnace; and
a melt supply pipe connecting the melting furnace to the plunger sleeve; and
molten aluminum flowing through the melt supply pipe;
wherein the melt supply pipe comprises:
an inner ceramic pipe having terminal connecting portions that abut adjacent inner ceramic pipes;
an outer steel pipe fitted, along its inside, around the inner pipe and configured to provide a clamp load to the terminal connecting portions to thereby reduce leakage of the melt supply through seams between abutting inner ceramic pipes;

a Ni alloy layer formed over the inside of the outer steel pipe, wherein the layer is formed over the inside surface of the outer steel pipe;

TiC particles bonded to the surface of the Ni alloy layer, wherein the TiC particles have an average diameter between about 10 μm to about 500 μm and are partially embedded within, but not entirely covered by, the Ni alloy layer; and a pair of fibrous sheet members, composed of an inorganic material having the property of expanding by heating, sandwiched between the inner ceramic pipe and the outer steel pipe at both ends of the pipes, wherein the fibrous sheet members expand at a temperature of molten aluminum to prevent molten aluminum from leaking through gaps between the inner ceramic pipes to reach the outer steel pipe;

wherein the TiC particles are bonded into the Ni alloy layer so that the TiC particles protrude inwardly, out of the Ni alloy layer on the inside surface of the outer steel pipe, toward the inner ceramic pipe, such that, as a function of the protruding TiC particles and positioning of the inner ceramic pipe within the outer steel pipe: (1) the TiC particles yield resistance to thermal stress even when the outer steel pipe expands or contracts, and (2) the TiC particles provide melt loss resistance from melt leaking through gaps between adjacent inner ceramic pipes to provide melting loss resistance of an enhanced nature over melt supply pipes that are absent TiC particulate material between inner and outer pipe elements; and wherein the melt supply pipe yields improved durability and extended operational life at a temperature of molten aluminum as a function of arrangement of the TiC particles and the fibrous sheets between the inner pipe and the outer pipe, which: (1) via fibrous sheets that expand at the temperature of molten aluminum, prevents molten aluminum from intrusion to the outer steel pipe between gaps in the inner ceramic pipes, (2) provides resistance to thermal stress stemming from expansion or contraction of the outer steel pipe, and (3) provides enhanced resistance of the outer steel pipe to melting loss caused by heat-related shock/stress given by contact with molten aluminum.

23. The melt supply pipe of claim 1 wherein the outer steel pipe has greater thermal expansion in a radial direction than the inner ceramic pipe at the temperature of molten aluminum, and wherein the fibrous sheet has properties of high heat resistance and of thermally expanding in the radial direction at a temperature of molten aluminum, such that the fibrous sheet will expand between the inner pipe and the outer pipe to fill and block up the gaps to prevent intrusion of the molten aluminum into the gaps.

24. The melt supply pipe of claim 23 wherein the TiC particles protrude out of the surface of the Ni alloy layer are partly exposed and thereby yield exposed surfaces of TiC material that protrude from the Ni alloy into contact with molten aluminum leaking through the gaps between adjacent inner ceramic pipes such that a contact angle between the molten aluminum and the surface is provided as a function of contact of the molten aluminum with the exposed surfaces of TiC material;

wherein, as a function of the exposed surfaces of the TiC particles protruding from the Ni alloy layer, the contact angle between the surface and the molten aluminum is increased as compared to where the TiC particles are not exposed on the surface, thereby enhancing the surface's property of repelling the molten aluminum.

* * * * *